July 31, 1945.    E. H. RUGG    2,380,793
OUTLET BOX SUPPORT
Filed Dec. 6, 1943

Inventor:
Edward H. Rugg,
by Harry E. Dunham
His Attorney.

Patented July 31, 1945

2,380,793

UNITED STATES PATENT OFFICE 2,380,793

OUTLET BOX SUPPORT

Edward H. Rugg, Bridgeport, Conn., assignor to General Electric Company, a corporation of New York Application December 6, 1943, Serial No. 513,157

3 Claims. (Cl. 248—298)

In connection with the electrical wiring of buildings, it is known to provide what is termed a bar hanger attached to the studding or joints of the building and upon which an outlet box is mounted, the arrangement being such that the box may be adjusted on the bar hanger to position it at the point where it is desired to locate a wiring fixture to be mounted on the box.

The object of my invention is to provide an improved construction and arrangement for fastening an outlet box to a bar hanger which is simple in structure, reliable in operation, easy to install, comprises a minimum number of parts and is capable of being manufactured at low cost.

For a consideration of what I believe to be novel and my invention, attention is directed to the following specification and to the claims appended thereto.

Figure 1:
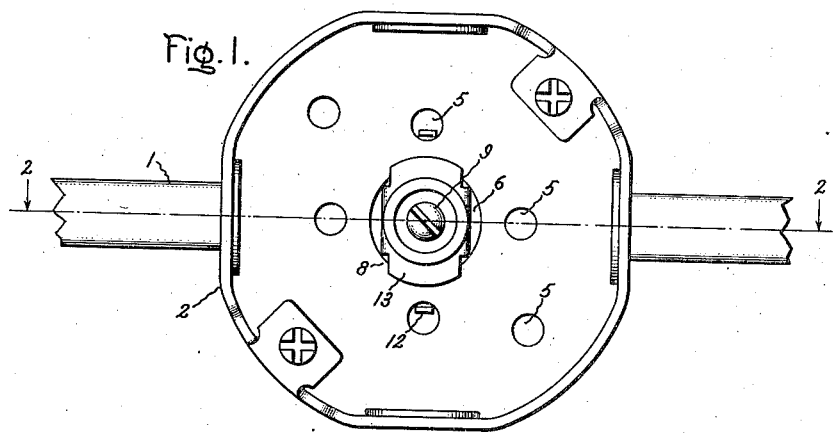
Figure 2:
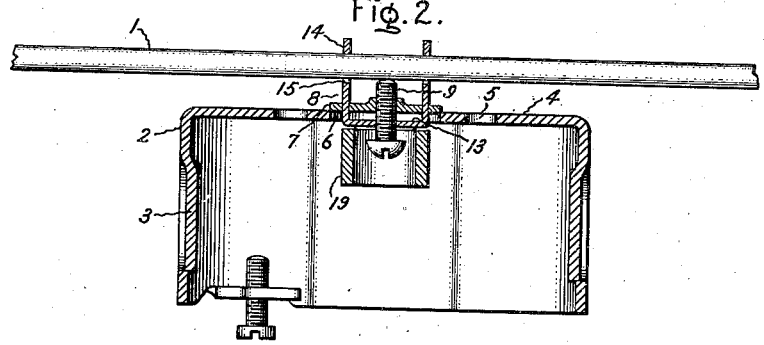
Figure 3:
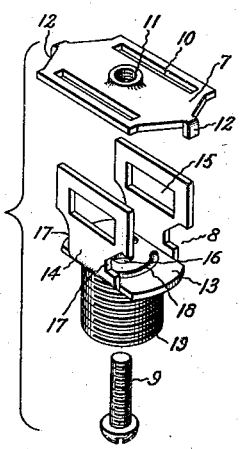

In the drawing, Fig. 1 is a face view of an outlet box attached to a bar hanger by a support embodying my invention; Fig. 2 is a sectional view taken on line 2—2, Fig. 1, and Fig. 3 is an exploded perspective view of the several elements of the support.

Referring to the drawing, 1 indicates a bar hanger which may be a strip of suitable metal adapted to be attached at its two ends to the studding of a building, and 2 is a known form of outlet box, it being provided with knockouts 3, as is well known. In the bottom 4 of the box are a number of openings 5 which may be used for attaching the box by means of screws directly to a wall in cases where the box is not mounted on a bar hanger. Also, in the bottom of the box is a central opening 6 initially closed by a knockout. A box as shown in the drawing is standardized in the wiring industry, the openings 5 and 6 of the boxes having always the same dimensions and the same arrangement relatively to each other. My invention has to do with a means for mounting such a standardized box on a bar hanger.

My improved mounting means or support comprises three parts, a slotted washer or back plate 7, a U-shaped clamping frame 8, and a fastening screw. The slotted washer or back plate is preferably made generally rectangular as best shown in Fig. 3 and along two of its sides is provided with longitudinally extending slots 10. At the center of the slotted washer or back plate is a tapped opening 11 threaded to receive screw 9 and at the two ends are turned-up ears 12 adapted to fit in a pair of opposite openings 5 in the bottom of an outlet box.

The clamping frame 8 comprises a base plate 13 of rectangular shape and two projecting side arms 14, each provided with an opening 15 of a size to loosely receive a bar hanger 1. Also, the side arms are of a dimension such that they will pass through the slots 10 in the slotted washer or back plate 7. In the center of base plate 13 is an opening 16 which is large enough for screw 9 to pass through. In the two opposed edges of side arms 14 are notches 17 which are so shaped and dimensioned that base plate 13 can be passed through opening 6 in the bottom of the box by tilting the clamping frame at a slight angle, passing one end through the opening to bring the edge of opening 6 into the notches 17 and then passing the other edge through, the notches 17 being deep enough to permit one end of base plate 13 to be moved sufficiently far through the opening that the other end will clear the edge of the opening.

In use, the parts of the supporting structure are assembled relatively to each other by passing the side arms 14 through slots 10 of the washer 7 and then passing screw 9 through opening 16 and threading it into tapped opening 11. This serves to hold the parts together. The assembled support is then mounted on the bar hanger by passing the bar hanger through openings 15 after which the bar hanger may be attached to the studding. In practice, the bar hanger may be sold with the support thereon although they may be sold as separate devices. When assembled, the arrangement is such that ears 12 project toward base plate 13.

Now, when it is desired to mount a box on the bar hanger, the knockout is removed from the opening 6 in the bottom of the box and the box is manipulated with respect to base plate 13 in the manner already explained to pass the base plate from behind the bottom of the box to the front of the bottom of the box. At the same time, the slotted washer or back plate 7 is positioned so that ears 12 project into a pair of the openings 5 as shown in Fig. 1. This serves to hold the washer from turning relatively to the box bottom. Washer 7 is of a size larger than opening 6 so it engages a box bottom around the opening. Following this, the screw 9 is screwed in to bring its end into engagement with the bar hanger 1 and as it is tightened, the slotted washer or back plate 12 will be forced down on the threads of the screw and pulled firmly against the outside surface of the bottom of the box, thus clamping the bottom of the box between the two ends of base plate 13 and the slotted washer or back plate 7 and, at the same time forcing the end of the screw tightly against the bar hanger thus clamping the bar hanger between the screw and the outer walls of slots 15. Thus, it will be seen that the box can be quickly, firmly, and easily attached to the bar hanger after the bar hanger is in place.

In some instances, it is desired to provide a fixture stud in connection with an outlet box of the type illustrated. In other instances, a fixture stud is not required. Preferably, I provide the base plate 13 with a plurality of arcuate-shaped bumps or projections 18 to which a piece of threaded pipe 19 may be welded to provide a fixture stud. In practice, the supporting structure may be manufactured both with and without a fixture stud attached thereto so that the electrician can utilize a fastener with or without a fixture stud as required in the particular instance.

My invention has the substantial advantage that the two parts 7 and 8 may be made from sheet metal by a simple stamping operation which means that they are capable of being manufactured at low cost. Similarly, the fixture stud, when it is to be provided, need comprise only a short length of threaded pipe which can be provided at low cost, and which can be quickly and readily welded to the base plate 13. Also, it will be clear that the box is quickly and easily attached to the support and clamped in the desired adjusted position on the bar hanger.

In accordance with the provisions of the patent statutes, I have described the principle of operation of my invention, together with the apparatus which I now consider to represent the best embodiment thereof, but I desire to have it understood that the apparatus shown is only illustrative and the invention may be carried out by other means.

What I claim as new and desire to secure by Letters Patent of the United States, is:

1. A support for attaching an outlet box to a bar hanger comprising a washer having spaced slots and a tapped opening, a U-shaped frame comprising a base and arms integral with the side edges of the base which extend through said slots and are provided with openings to receive a bar hanger, said base being provided with a screw opening and being of a length such that it can be passed angularly through a knockout opening in an outlet box and positioned so its two ends engage the inner surface of such a box, and a screw which passes through said opening in the base and threads into said tapped opening.

2. A support for attaching an outlet box to a bar hanger comprising a washer having spaced slots and a tapped opening, a U-shaped frame comprising a base and arms integral with the side edges of the base which extend through said slots and are provided with openings to receive a bar hanger, said base being provided with a screw opening and being of a length such that it can be passed angularly through a knockout opening in an outlet box and positioned so its two ends engage the inner surface of such a box, and a screw which passes through said opening in the base and threads into said tapped opening, said washer being provided with ears adapted to engage in screw openings in an outlet box.

3. A support for attaching an outlet box to a bar hanger comprising an elongated generally rectangular washer having slots along its two sides, a tapped opening and angularly extending ears at its two ends, a U-shaped frame having a generally rectangular base narrower in one dimension than the knockout opening of an outlet box and longer in the other dimension, said base being adapted to be passed angularly through a knockout opening and turned to bring portions of said base into engagement with a wall of a knockout opening, and arms which extend through the slots in said washer and are provided with openings for a bar hanger, said rectangular base having a screw opening, and a screw which passes through said screw opening and threads into said tapped opening.

EDWARD H. RUGG.